Oct. 20, 1931.  P. F. SCHOFIELD  1,828,685
GAS CONTROL FOR MOTOR VEHICLES
Filed June 16, 1930
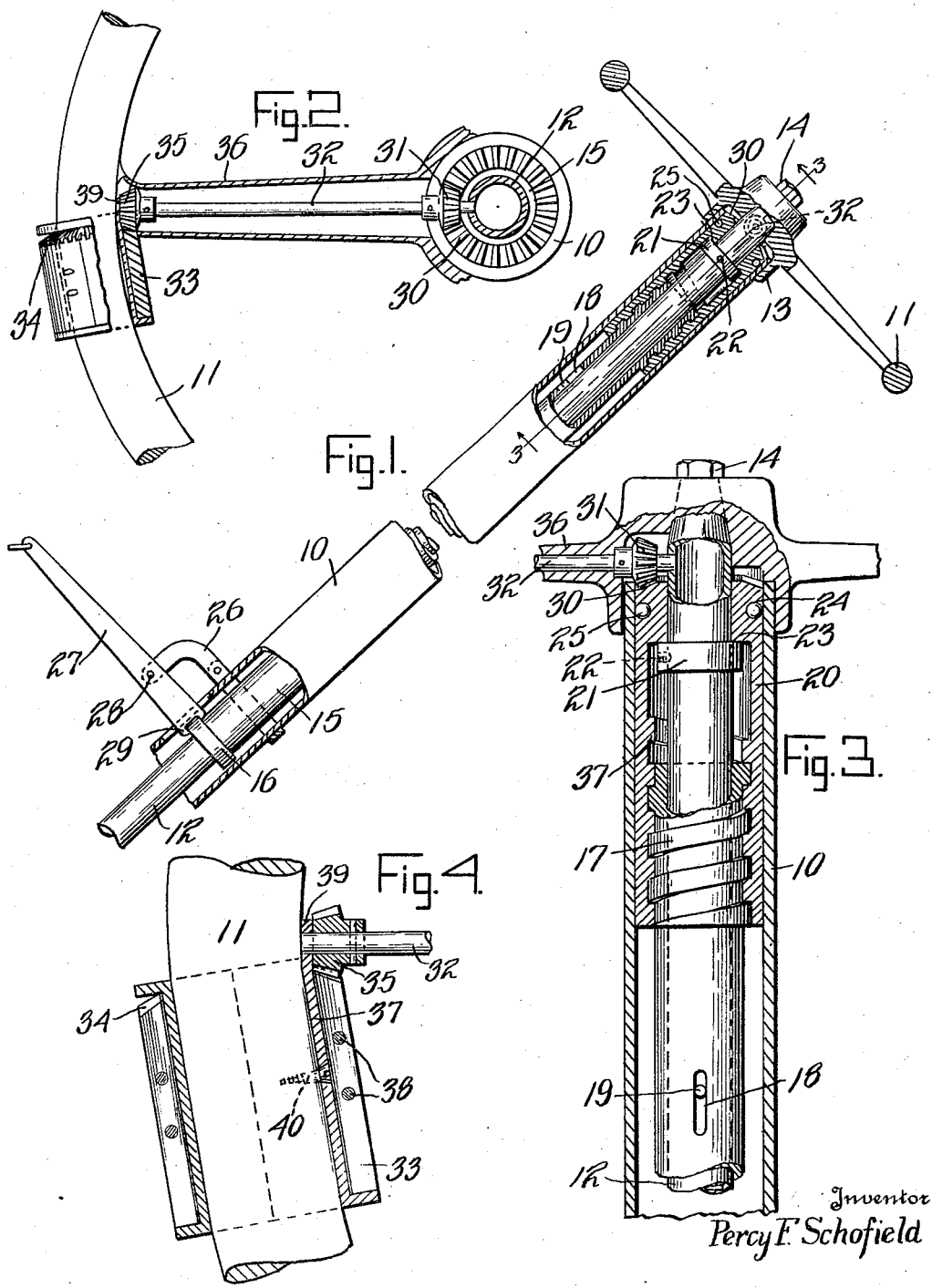
Inventor
Percy F. Schofield Patented Oct. 20, 1931

1,828,685

UNITED STATES PATENT OFFICE

PERCY F. SCHOFIELD, OF MIAMI, FLORIDA

GAS CONTROL FOR MOTOR VEHICLES

Application filed June 16, 1930. Serial No. 461,602.

This invention relates to gas control mechanism for motor vehicles and an object of the invention is to provide means mounted on the steering wheel of the automobile for controlling the gas feed.

A further object of the invention is to provide a gas feed which may be adapted for use with motor vehicles now in use, by means of which an auxiliary gas feed may be provided on the steering wheel of the vehicle.

Referring to the accompanying drawings, which are made a part hereof and on which similar reference characters indicate similar parts, Figure 1 is a perspective view partly in section of the device applied to the steering column of an automobile, Figure 2, a plan view of the device partly in section showing it applied to the steering wheel of the automobile, Figure 3, an enlarged section on line 3—3 of Figure 1, and Figure 4, an enlarged detail view.

In the drawings numeral 10 indicates the rigid sleeve mounted to the body of the car and in which the steering mechanism is housed. Numeral 11 indicates the steering wheel and 12 the steering rod, the wheel 11 having a flange portion 13 which fits over the upper end of the sleeve 10. The steering wheel 11 is secured to the steering rod by means of a nut 14.

The mechanism so far described is the ordinary mechanism for many makes of automobiles.

A sleeve 15 is mounted upon the steering rod 12. This sleeve has a shouldered end portion 16 and a threaded portion 17 at its upper end. A slot 18 is cut in the sleeve near its upper end and a pin 19 is carried by the steering rod 12 and positioned within this slot to prevent relative rotation between the sleeve 15 and the steering rod 12. A short sleeve 20 provided with internal threads 37 is mounted on the upper end of the sleeve 15. A collar 21 is secured on the steering post 12 by means of set screws 22. This collar engages a shoulder 23 on the sleeve 20 to hold the sleeve 20 from axial movement on the sleeve 15. The sleeve 20 is provided with an annular groove 24 to receive ball bearings 25 to permit easy rotation of the sleeve 20 within the casing 10. A bracket 26 is mounted upon the lower end of the casing 10 and a lever 27 is pivoted at 28 to this bracket. Lever 27 has short bifurcations 29 which fit over the shouldered end portion 16. The outer end of the lever 27 is connected to the carbureter throttle.

From the description so far given it will be seen that rotation of the sleeve 20 will move the sleeve 15 axially within the casing 10 and consequently rock the lever 27 on its pivot 28 to operate the throttle valve not shown. The pin 19 prevents rotation of the sleeve 15, and since the sleeve 20 cannot move axially but can rotate within the casing 10, such rotation must move the sleeve 15 axially as stated. The upper end of the sleeve 20 is provided with beveled gear teeth 30. A bevel gear 31 on the inner end of a shaft 32 meshes with the bevel gear 30. Mounted on the rim of the steering wheel is a spool or ring 33. A portion of the steering wheel may be cut away to allow this ring to seat within the perimeter of the wheel. The spool 33 has a bevel gear 34 on one end which meshes with a corresponding bevel gear 35 on the shaft 32. The shaft 32 preferably may be mounted within a spoke 36 of the steering wheel so as to conceal it as well as to place it in a position where it will not be in the way.

The spool 33 is mounted on a flanged bushing 37. In order to mount it the spool is split and secured together in any suitable way as by dowel pins 38. The bushing 37 has an end 39 which provided a bearing for the end of the shaft 32 so that the bevel gear 35 is held in engagement with the bevel gear 34. The bushing 37 may be secured in place on the rim 11 by a set screw 40.

From the description just given it may now clearly be seen that the sleeve 20 may be rotated by means of the spool 33 on the rim of the steering wheel, such spool being in a convenient place for the operator.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. Gas feeding mechanism for motor vehicles comprising a tube slidably mounted on the steering rod of the motor vehicle, operative connection between said tube and the throttle valve of the vehicle, a sleeve screw threaded on the upper end of the said tube and secured against axial movement, means for preventing rotation of the tube but to permit axial movement of the same, and means for rotating the said sleeve to move the tube axially to operate the throttle valve of the motor vehicle, substantially as set forth.

2. Means for operating the gas feed of a motor vehicle comprising a tube slidably mounted on the steering rod of the motor vehicle, means on the steering rod for preventing rotation of the tube but to permit axial movement of the same, means connected to the tube and to the throttle valve of the motor vehicle whereby axial movement of the tube will operate the throttle valve, a rotatable sleeve screw-threaded upon the upper end of the said tube, said sleeve having a bevel gear cut in its upper end, a spool mounted on the rim of the steering wheel of the motor vehicle, said spool having a bevel gear thereon, a shaft mounted within a spoke of the steering wheel, said shaft having a bevel wheel on each end meshing respectively with the said spool and the said sleeve whereby rotation of the spool will rotate the sleeve to move said tube axially, substantially as set forth.

3. A gas feed mechanism for motor vehicles comprising a tube slidably mounted on the steering rod of an automobile, said tube being provided with screw-threads on its upper end and a collar fixed on the lower end, a pivoted lever engageable with said collar for operating the throttle, a screw-threaded sleeve mounted on the upper end of said tube, means fixed on the steering post for preventing axial movement of said sleeve but to permit rotation thereof, said sleeve having a bevel gear cut on its upper end, a spool rotatably mounted in the rim of the steering wheel and having a bevel gear cut on its end, and operative means connecting said bevel gears for rotating the said sleeve, substantially as set forth.

In witness whereof, I have hereunto set my hand at Washington, District of Columbia, this 12th day of June, A. D. nineteen hundred and thirty.

PERCY F. SCHOFIELD.